(12) United States Patent
Kozuka et al.

(10) Patent No.: US 10,629,322 B2
(45) Date of Patent: Apr. 21, 2020

(54) ELECTRICALLY CONDUCTIVE OXIDE SINTERED COMPACT, MEMBER FOR ELECTRICAL CONDUCTION, GAS SENSOR, PIEZOELECTRIC ELEMENT, AND METHOD FOR PRODUCING PIEZOELECTRIC ELEMENT

(71) Applicant: NGK SPARK PLUG CO., LTD., Nagoya-shi, Aichi (JP)

(72) Inventors: Hisashi Kozuka, Ichinomiya (JP); Yasuyuki Okimura, Inuyama (JP); Kazushige Ohbayashi, Nagoya (JP)

(73) Assignee: NGK SPARK PLUG CO., LTD., Aichi (JP)

(*) Notice: Subject to any disclaimer, the term of this patent is extended or adjusted under 35 U.S.C. 154(b) by 41 days.

(21) Appl. No.: 15/528,991

(22) PCT Filed: Dec. 7, 2015

(86) PCT No.: PCT/JP2015/006071
§ 371 (c)(1),
(2) Date: May 23, 2017

(87) PCT Pub. No.: WO2016/098309
PCT Pub. Date: Jun. 23, 2016

(65) Prior Publication Data
US 2018/0330843 A1      Nov. 15, 2018

(30) Foreign Application Priority Data
Dec. 15, 2014   (JP) .................. 2014-252801

(51) Int. Cl.
| H01B 1/08 | (2006.01) |
| C04B 35/50 | (2006.01) |
| G01N 27/24 | (2006.01) |
| G01N 29/24 | (2006.01) |
| C04B 35/468 | (2006.01) |
| C04B 35/49 | (2006.01) |
| G01N 27/407 | (2006.01) |
| G01N 29/02 | (2006.01) |

(52) U.S. Cl.
CPC ........... *H01B 1/08* (2013.01); *C04B 35/4682* (2013.01); *C04B 35/49* (2013.01); *C04B 35/50* (2013.01); *G01N 27/4073* (2013.01); *G01N 29/022* (2013.01); *G01N 29/2437* (2013.01); *C04B 2235/3201* (2013.01); *C04B 2235/3203* (2013.01); *C04B 2235/3208* (2013.01); *C04B 2235/604* (2013.01); *C04B 2235/762* (2013.01); *G01N 2291/0255* (2013.01); *G01N 2291/0256* (2013.01); *G01N 2291/0426* (2013.01)

(58) Field of Classification Search
None
See application file for complete search history.

(56) References Cited

U.S. PATENT DOCUMENTS

| 5,497,022 A | 3/1996 | Sakamoto |
| 6,054,403 A | 4/2000 | Kawase et al. |
| 2009/0242851 A1* | 10/2009 | Mayuzumi ............... C01G 9/02 252/512 |
| 2015/0099142 A1 | 4/2015 | Kozuka et al. |
| 2016/0036063 A1* | 2/2016 | Wang .................. H01M 4/9033 429/489 |

FOREIGN PATENT DOCUMENTS

| EP | 3 130 573 A1 | 2/2017 |
| JP | 06-275724 A | 9/1994 |
| JP | 11-116334 A | 4/1999 |
| JP | 2002-087882 A | 3/2002 |
| JP | 3286906 B2 | 5/2002 |
| JP | 5823014 B2 | 11/2015 |
| WO | 2013/150779 A1 | 10/2013 |

OTHER PUBLICATIONS

Yildez et al. Properties of Ceria Based Novel Anode Nanopowders Synthesized by Glycine-Nitrate Process. Proceedings of the 2nd International Congress, Turkey (Year: 2012).*
Ö. Yildiz, et al., "Characterization of $MO_y$-$M_x Ce_{1-x} O_{2-\delta}$(M: Co, Ni & Cu) nano powders and anode materials for low and intermediate temperature solid oxide fuel cells", International Journal of Hydrogen Energy, Aug. 1, 2015, pp. 14085-14094.
International Search Report for PCT/JP2015/006071 dated Mar. 8, 2016 [PCT/ISA/210].

* cited by examiner

*Primary Examiner* — Tanisha Diggs
(74) *Attorney, Agent, or Firm* — Sughrue Mion, PLLC (57) ABSTRACT

An electrically conductive oxide sintered compact according to one embodiment of the present invention includes a crystal phase that has a perovskite oxide crystal structure represented by the composition formula: $RE_a Co_b Cu_c Ni_d O_x$ where RE is a rare-earth element; $a+b+c+d=1$; and $1.25 \leq x \leq 1.75$, wherein the values of a, b, c and d respectively satisfy the following conditions: $0.474 \leq a \leq 0.512$; $0.050 \leq b \leq 0.350$; $0 \leq c \leq 0.250$; and $0.050 \leq d \leq 0.350$.

6 Claims, 10 Drawing Sheets

| Sample | Composition Formula: RE$_a$Co$_b$Cu$_c$Ni$_d$O$_x$ ||||| Firing Temp. (°C) | Evaluation Results ||||
| | Constituent Element (Mole Ratio) ||||| | | | | |
| | RE | a | b | c | d | | Room-Temp. Conductivity (S/cm) | Specific Gravity (g/cm³) | Sinterability | Peel Strength |
|---|---|---|---|---|---|---|---|---|---|---|
| S01 | La | 0.500 | 0.225 | 0.025 | 0.250 | 1450 | 1786 | 6.99 | ○ | △ |
| S02 | La | 0.500 | 0.200 | 0.050 | 0.250 | 1300 | 1584 | 6.50 | ○ | ○ |
| S03 | La | 0.500 | 0.150 | 0.100 | 0.250 | 1200 | 1953 | 7.08 | ○ | ○ |
| S04 | La | 0.500 | 0.125 | 0.125 | 0.250 | 1150 | 1831 | 7.06 | ○ | ○ |
| S05 | La | 0.500 | 0.100 | 0.150 | 0.250 | 1100 | 1998 | 7.09 | ○ | ○ |
| S06 | La | 0.500 | 0.075 | 0.175 | 0.250 | 1100 | 1984 | 7.09 | ○ | ○ |
| S07 | La | 0.500 | 0.050 | 0.200 | 0.250 | 1100 | 1536 | 7.06 | ○ | △ |
| S08 | La | 0.500 | 0.250 | 0.050 | 0.200 | 1400 | 1258 | 6.95 | ○ | ○ |
| S09 | La | 0.500 | 0.250 | 0.100 | 0.150 | 1200 | 1038 | 7.09 | ○ | ○ |
| S10 | La | 0.500 | 0.250 | 0.150 | 0.100 | 1150 | 694 | 7.09 | ○ | ○ |
| S11 | La | 0.500 | 0.250 | 0.200 | 0.050 | 1100 | 391 | 7.10 | ○ | ○ |
| S12 | La | 0.500 | 0.100 | 0.100 | 0.300 | 1200 | 471 | 6.89 | ○ | ○ |
| S13 | La | 0.474 | 0.050 | 0.100 | 0.350 | 1200 | 200 | 6.54 | ○ | ○ |
| S14 | La | 0.487 | 0.158 | 0.105 | 0.263 | 1300 | 278 | 7.04 | ○ | ○ |
| S15 | La | 0.512 | 0.154 | 0.103 | 0.256 | 1250 | 1429 | 7.02 | ○ | ○ |
| S16 | La | 0.500 | 0.146 | 0.098 | 0.244 | 1250 | 222 | 6.86 | ○ | ○ |
| S17 | Pr | 0.500 | 0.150 | 0.100 | 0.250 | 1300 | 111 | 7.10 | ○ | ○ |
| S18 | Nd | 0.500 | 0.150 | 0.100 | 0.250 | 1300 | 286 | 7.03 | ○ | ○ |
| S19 | La | 0.500 | 0.350 | 0.100 | 0.050 | 1350 | 233 | 6.81 | △ | ○ |
| S31 | La | 0.500 | 0.250 | 0.000 | 0.250 | 1550 | 1929 | 7.06 | ○ | × |
| S32 | La | 0.500 | 0.000 | 0.250 | 0.250 | 1100 | 14 | 6.97 | △ | △ |
| S33 | La | 0.500 | 0.250 | 0.250 | 0.000 | 1050 | 95 | 6.70 | ○ | ○ |
| S34 | La | 0.459 | 0.162 | 0.108 | 0.270 | 1400 | 77 | 6.66 | △ | △ |
| S35 | La | 0.524 | 0.143 | 0.095 | 0.238 | 1250 | 29 | 6.72 | ○ | ○ |
| S36 | La | 0.500 | 0.400 | 0.100 | 0.000 | 1350 | 71 | 6.43 | △ | ○ |
| S37 | La | 0.500 | 0.000 | 0.100 | 0.400 | Not Sintered | — | — | × | × |

FIG. 5

B Constant of Typical Samples

| Sample | Evaluation Results | | $B_{25-900}$ Constant (K) |
|---|---|---|---|
| | Conductivity σ (S/cm) | | |
| | 25°C | 900°C | |
| S02 | 1584 | 1161 | −124 |
| S05 | 1998 | 1161 | −217 |
| S09 | 1038 | 1232 | 69 |
| S12 | 471 | 467 | −3 |
| S13 | 200 | 266 | 116 |

FIG. 6A

Relationship between Specific Gravity and Firing Temperature (d = 0.25)

FIG. 6B

Relationship between Room-Temperature Conductivity and Firing Temperature (d = 0.25)

FIG. 7A  Relationship between Specific Gravity and Firing Temperature (b = 0.25)

FIG. 7B  Relationship between Room-Temperature Conductivity and Firing Temperature (b = 0.25)

| Sample | Composition of Piezoelectric Ceramic Material | | | | | | | | | | Material Composition of Oxide Electrode | Piezoelectric Constant $d_{33}$ pC/N | Relative Dielectric Constant $\varepsilon_{33}^T/\varepsilon_0$ |
|---|---|---|---|---|---|---|---|---|---|---|---|---|---|
| | Main Crystal Phase | | | | | | | | | Sub Phase (Additive) | | | |
| | $a$ | $b$ | $c$ | $d1$ | $d2$ | $e$ | $f1$ | $f2$ | $f3$ | | | | |
| S38 | 0.356 | 0.551 | 0.021 | 0.037 | 0.036 | 1.070 | 0.937 | 0.037 | 0.026 | $Co_3O_4$ ZnO $Fe_2O_3$ | S05 | 313 | 2335 |
| S39 | 0.349 | 0.540 | 0.020 | 0.036 | 0.054 | 1.070 | 0.919 | 0.055 | 0.025 | $Co_3O_4$ ZnO $Fe_2O_3$ | S05 | 331 | 2916 |
| S40 | 0.347 | 0.537 | 0.020 | 0.036 | 0.060 | 1.070 | 0.913 | 0.062 | 0.025 | $Co_3O_4$ ZnO $Fe_2O_3$ | S05 | 338 | 3339 |

Main Crystal Phase: $(K_a Na_b Li_c Ca_{d1} Ba_{d2})_e (Nb_{f1} Zr_{f2} Ti_{f3}) O_h$
$a + b + c + d1 + d2 = 1$
$e$: arbitrary value
$f1 + f2 + f3 = 1$
$h$: arbitrary value for formation of perovskite oxide

ELECTRICALLY CONDUCTIVE OXIDE SINTERED COMPACT, MEMBER FOR ELECTRICAL CONDUCTION, GAS SENSOR, PIEZOELECTRIC ELEMENT, AND METHOD FOR PRODUCING PIEZOELECTRIC ELEMENT

CROSS REFERENCE TO RELATED APPLICATIONS

This application is a National Stage of International Application No. PCT/JP2015/006071 filed Dec. 7, 2015, claiming priority based on Japanese Patent Application No. 2014-252801 filed Dec. 15, 2014, the contents of all of which are incorporated herein by reference in their entirety.

FIELD OF THE INVENTION

The present invention relates to an electrically conductive oxide sintered compact and to an electrical conduction member, a gas sensor and a piezoelectric element, each of which utilizes the electrically conductive oxide sintered compact, and a method for producing the piezoelectric element.

BACKGROUND ART

A ceramic product as an electronic component has a ceramic substrate and an electrode generally formed of metal on the ceramic substrate. Examples of such a ceramic product are a laminated ceramic capacitor with a Ni electrode, Pd electrode or Pt electrode, a LTCC (low temperature co-fired ceramic) component with a Ag electrode, Cu electrode or Ag—Pd electrode, a piezo actuator with a Pd electrode, a semiconductor package with a W electrode, and a spark plug with a Ir electrode or a Pt electrode.

However, the firing of Ni, Cu, W with the ceramic substrate requires atmosphere control that makes it difficult to attain the intended performance of the ceramic substrate and results in high production cost. On the other hand, the melting point of Ag is low (962° C.) so that not only the material of the ceramic substrate applicable becomes limited, but also the properties of the ceramic substrate may be impaired by low-temperature firing. Further, noble metals such as Pd, Ir and Pt are expensive so that it is difficult to use these noble metals for electrode applications where large areas are required.

Patent Document 1 discloses, as an oxide material for an electrode, a lanthanum-cobalt oxide having negative resistance temperature characteristics in which the oxide shows a high resistance at room temperature and decreases in resistance with increasing temperature. Patent Document 2 discloses a lanthanum-cobalt oxide that shows a high resistance at around room temperature and has a B constant large in absolute value at high temperatures. Patent Document 3 discloses a non-magnetic substrate material for a magnetic head and teaches a La(Co,Ni)$O_3$ oxide as a reference example.

However, the conductive oxides as disclosed in Patent Documents 1 and 2 are high in resistance and insufficient in conductivity at room temperature. The La(Co,Ni)$O_3$ oxide as disclosed in Patent Document 3 is not adequate as an electrode material in light of the description that the oxide develops a crack which causes an increase in electrical resistance.

Since the ceramic component with the metal electrode faces the above various problems, the present inventors have studied the use of an oxide (ceramic) electrode as a substitute for the metal electrode. However, conventional oxides are much lower in conductivity and larger in B-value (temperature coefficient) than metals so that it is difficult to use electrodes of such oxides as substitutes for the metal oxide. Ruthenium oxides (such as $RuO_2$ and $SrRuO_3$) are known as high conductivity oxides, but has the problem that Ru is expensive. The present applicant has disclosed, in Patent Document 4, an oxide sintered compact having a high conductivity and small B constant (temperature coefficient) and suitable as a conductive material.

PRIOR ART DOCUMENTS

Patent Document

Patent Document 1: Japanese Patent No. 3286906
Patent Document 2: Japanese Laid-Open Patent Publication No. 2002-87882
Patent Document 3: Japanese Laid-Open Patent Publication No. H06-275724
Patent Document 4: International Publication No. 2013/150779

SUMMARY OF THE INVENTION

Problems to be Solved by the Invention

The present inventors have found that the conductive oxide sintered compact as disclosed in Patent Document 4 is still susceptible to improvement. In the case of forming a sintered compact of conductive oxide on an oxide substrate, for example, it is desirable that the firing temperature of the conductive oxide can be freely selected depending on the material of the substrate, the production conditions of the ceramic product etc. More specifically, there is a case where a low firing temperature of the order of 1100° C. is desirable for the secondary firing of a conductive oxide on a sintered substrate of oxide. By such low temperature firing at about 1100° C., the reaction between the oxide as the material of the substrate and the conductive oxide can be reduced or suppressed so as to decrease the possibility that the intended properties of the oxide substrate may be impaired. There is also a case where a firing temperature of 1350° C. or higher is required for the simultaneous firing of a conductive oxide on a substrate of oxide such as alumina or zirconia. In this case, the occurrence of warpage or cracking in the ceramic product can be suppressed by setting the firing temperature of the substrate and the firing temperature of the conductive oxide to be in agreement with each other. Moreover, the adhesion between the substrate and the conductive oxide can be improved by optimizing the firing temperature of the conductive oxide depending on the material of the substrate. In view of these circumstances, it is desirable that the firing temperature of the conductive oxide can be freely selected from a wide temperature range.

Conventionally, metals such as Ag, Pd, Au, Pt, Ni and Cu are used as electrode materials for piezoelectric elements. However, Ag, Pd, Au and Pt have the problem that these metals are expensive as raw materials. Further, Ni and Cu have the problem that these metals need to be fired under a reducing atmosphere to prevent oxidation and cannot be fired under an air atmosphere. There are conventionally known no metal electrode materials for piezoelectric elements which are low in price and capable of being fired under an air atmosphere.

The conductive oxide material as disclosed in Patent Document 4 is known as an electrode material which is low in price and capable of being fired under an air atmosphere, but needs to be fired at a high firing temperature of 1250° C. or higher. It is however preferable that an electrode material for a piezoelectric element is fired at 1200° C. or lower because a piezoelectric material contains a low melting element (such as alkali metal, Pb, Bi etc.) as a main component. It has thus been demanded to provide, as an electrode material for a piezoelectric element, a conductive oxide capable of being fired at a firing temperature of 1200° C. or lower under an air atmosphere.

Means for Solving the Problems

The present invention has been made in order to solve the foregoing problems and can be embodied as the following application examples.

(1) According to one aspect of the invention, there is provided an electrically conductive oxide sintered compact, comprising a crystal phase that has a perovskite oxide crystal structure represented by the composition formula: $RE_aCo_bCu_cNi_dO_x$ where RE is a rare-earth element; $a+b+c+d=1$; and $1.25 \leq x \leq 1.75$, wherein the values of a, b, c and d respectively satisfy the following conditions: $0.474 \leq a \leq 0.512$; $0.050 \leq b \leq 0.350$; $0 < c < 0.250$; and $0.050 \leq d \leq 0.350$.

This electrically conductive oxide sintered compact shows a room-temperature conductivity of 100 S/cm or higher and has a firing temperature selectable within the range of about 1100° C. to about 1500° C.

(2) In the above electrically conductive oxide sintered compact, the rare-earth element RE may be La.

In this case, the electrically conductive oxide sintered compact shows a higher room-temperature conductivity.

(3) In the above electrically conductive oxide sintered compact, the values of a, b, c and d may respectively satisfy the following conditions: $0.487 \leq a \leq 0.506$; $0.050 \leq b \leq 0.250$; $0 < c < 0.250$; and $0.200 \leq d \leq 0.275$.

In this case, the electrically conductive oxide sintered compact shows a room-temperature conductivity of 400 S/cm or higher while having a firing temperature selectable within the range of about 1100° C. to about 1500° C. Further, the electrically conductive oxide sintered compact shows a room-temperature conductivity of 1200 S/cm or higher by selection of the optimal firing temperature.

The present invention can be embodied in various forms including, not only the electrically conductive oxide sintered compact, but also electrodes, electrical wirings, electrical conduction members, gas sensors (e.g. oxygen sensor, NOx sensor etc.), thermoelectric materials, heater materials, piezoelectric elements and temperature sensing elements each using the electrically conductive oxide sintered compact, and production methods thereof. For example, the above electrically conductive oxide sintered compact can be fired at a firing temperature of 1200° C. or lower under an air atmosphere and thus can suitably be applied as an electrode material for a piezoelectric element.

BRIEF DESCRIPTION OF DRAWINGS

FIG. 4 is a diagram showing compositions and properties of respective samples.

DESCRIPTION OF EMBODIMENTS

A. Composition of Electrically Conductive Oxide Sintered Compact

An electrically conductive oxide sintered compact according to one embodiment of the present invention is in the form of an oxide sintered compact containing a crystal phase that has a perovskite oxide crystal structure represented by the following composition formula:

$$RE_1Co_bCu_cNi_dO_x \qquad (1)$$

where RE is a rare-earth element; $a+b+c+d=1$; and $1.25 \leq x \leq 1.75$.

Herein, the values of the respective parameters a, b, c and d respectively satisfy the following conditions.

$$0.474 \leq a \leq 0.512 \qquad (2a)$$

$$0.050 \leq b \leq 0.350 \qquad (2b)$$

$$0 < c < 0.250 \qquad (2c)$$

$$0.050 \leq d \leq 0.350 \qquad (2d)$$

As the rare-earth element RE, one or more kinds of various rare-earth elements such as La, Ce, Pr, Nd, Pm and Sm may be contained. It is preferable to contain one or more of La, Pr and Nd as the rare-earth element RE. In order for the electrically conductive oxide sintered compact to show a higher room-temperature conductivity, it is particularly preferable to contain only La (lanthanum) as the rare-earth element RE. The electrically conductive oxide sintered compact in which only La is contained as the rare-earth element RE is also preferred in that the B constant of the electrically conductive oxide sintered compact is smaller in absolute value.

By satisfaction of the above conditions (2a) to (2d), the electrically conductive oxide sintered compact shows a room-temperature conductivity of 100 S/cm or higher and has a firing temperature selectable within the range of about 1100° C. to about 1500° C. When the parameter value a for the rare-earth element RE is smaller than 0.474 or exceeds 0.512, the electrically conductive oxide sintered compact may not shows a room-temperature conductivity of 100 S/cm or higher. The term "room-temperature conductivity" as used herein refers to a conductivity measured at 25° C. When the parameter value b for Co (cobalt) is smaller than 0.050 or exceeds 0.350, the electrically conductive oxide sintered compact may not shows a room-temperature conductivity of 100 S/cm or higher or may be poor in sinterability. When the parameter value c for Cu (copper) is 0 or 0.250 or larger, the electrically conductive oxide sintered compact may not show sufficient adhesion to ceramic substrates, may not show a room-temperature conductivity of 100 S/cm or higher or may be poor in sinterability. When the parameter value d for Ni (nickel) is smaller than 0.050 or exceeds 0.350, the electrically conductive oxide sintered compact may not shows a room-temperature conductivity of 100 S/cm or higher or may be poor in sinterability.

It is preferable that the parameter values a, b, c and d respectively satisfy the following conditions.

$$0.487 \leq a \leq 0.506 \quad (3a)$$

$$0.050 \leq b \leq 0.250 \quad (3b)$$

$$0 < c < 0.250 \quad (3c)$$

$$0.200 \leq d \leq 0.275 \quad (3d)$$

By satisfaction of the these conditions, the electrically conductive oxide sintered compact shows a room-temperature conductivity of 400 S/cm or higher while having a firing temperature selectable within the range of about 1100° C. to about 1500° C. Further, the electrically conductive oxide sintered compact shows a room-temperature conductivity of 1200 S/cm or higher by selection of the optimal firing temperature.

The parameter value x for O (oxygen) is theoretically 1.5 when the entire oxide sintered compact of the above composition consists of the perovskite phase. However, there is a case where the composition ratio of oxygen may be deviated from its stoichiometric value. Typically, the range of the parameter value x is defined as $1.25 \leq x \leq 1.75$.

There is no particular limitation on the electrically conductive oxide sintered compact according to the one embodiment of the present invention as long as the perovskite phase of the above composition is contained in the electrically conductive oxide sintered compact. The electrically conductive oxide sintered compact may contain any other kind of oxide. For example, it can be judged that the perovskite phase is contained in the electrically conductive oxide sintered compact in the case where peaks of the oxide RE·MO$_3$ (where M is Co, Cu or Ni) is detected by powder X-ray diffraction (XRD) analysis of the electrically conductive oxide sintered compact. Preferably, the perovskite phase of the above composition is contained in an amount of 50 mass % or more in the electrically conductive oxide sintered compact. Although the electrically conductive oxide sintered compact may contain a very small amount of alkaline-earth metal element within the range that does not affect the conductivity of the electrically conductive oxide sintered compact, it is preferable that the electrically conductive oxide sintered compact is substantially free of alkaline-earth metal element. In this case, it is less likely that absorption or desorption of oxide will occur even when the electrically conductive oxide sintered compact is exposed to a wide temperature range from room temperature to about 900° C. Thus, the weight change of the oxide sintered compact is small so that the oxide sintered compact is suitable as a conductive material for use under high temperature conditions. In the present specification, the expression "substantially free of alkaline-earth metal element" means that alkaline-earth metal element cannot be detected or identified by X-ray fluorescence (XRF) analysis.

The electrically conductive oxide sintered compact according to the one embodiment of the present invention are usable as substitutes for metals in various electrodes, electrical wirings, electrical conduction members, gas sensors, thermoelectric materials, heater materials and temperature sensing elements. For example, there can be provided an electrical conduction member in which a conductor layer of the electrically conductive oxide sintered compact is formed on a surface of a ceramic substrate. Further, there can be provided a gas sensor with an electrode of the electrically conductive oxide sintered compact.

B. Production Method

Figure 1:
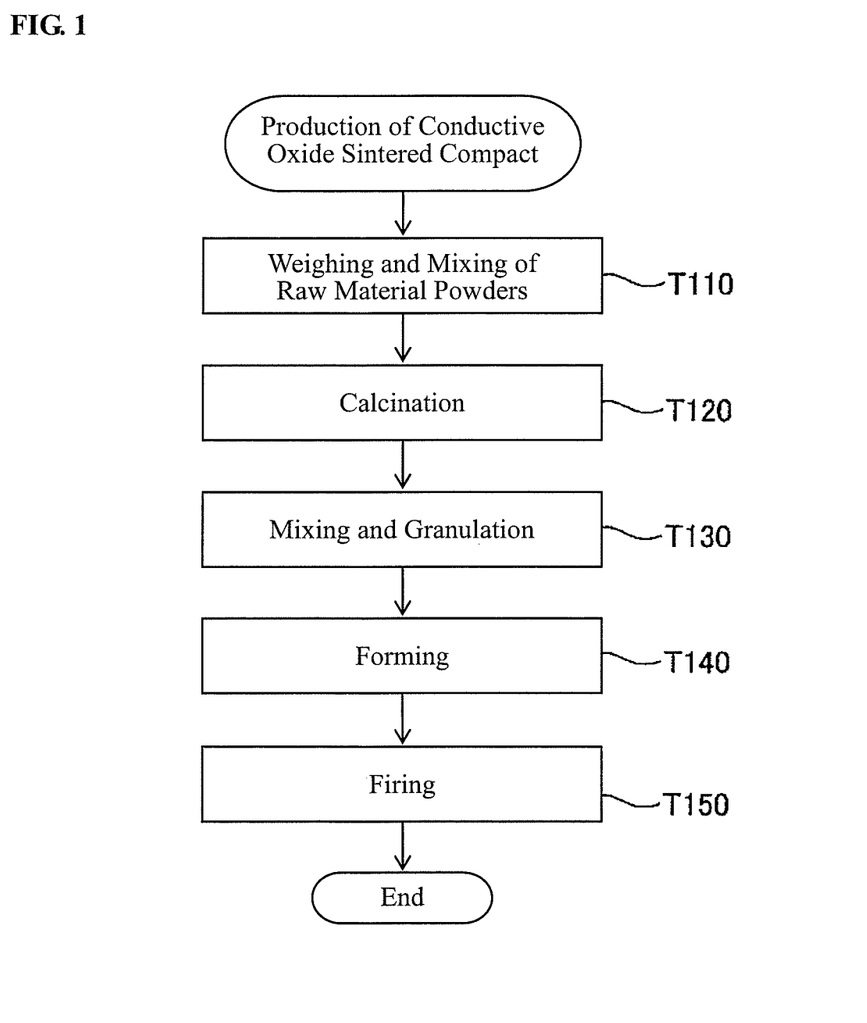
FIG. 1 is a flowchart showing a method for production of an electrically conductive oxide sintered compact according to one embodiment of the present invention.

FIG. 1 is a flowchart showing a method for production of the electrically conductive oxide sintered compact according to the one embodiment of the present invention. In step T110, raw material powders for the electrically conductive oxide sintered compact are weighed, mixed together by wet mixing and then dried. There is thus prepared a raw powder mixture. For example, powders of REOH$_2$ or RE$_2$O$_3$, Co$_3$O$_4$, CuO and NiO can be used as the raw material powders. In step T120, the raw powder mixture is calcined at 700 to 1200° C. for 1 to 5 hours under an air atmosphere to provide a calcined powder. In step T130, a slurry is prepared by adding an adequate amount of organic binder to the calcined powder, putting the powder mixture with a dispersion solvent (e.g. ethanol) into a resin pot and subjecting the resulting mixture to wet mixing and crushing with the use of zirconia balls. Further, a granulated power is provided by drying the slurry at 80° C. for 2 hours and sieving the dried substance through a 250-μm mesh screen in step T130. In step S140, the granulated powder is formed by a press machine. In step S150, the thus-formed compact is fired at a firing temperature higher than the calcination temperature in step T120 (which is generally 1000 to 1550° C., preferably about 1100 to 1500° C.) for 1 to 5 hours under an air atmosphere. By this, the electrically conductive oxide sintered compact is obtained. After the firing, the electrically conductive oxide sintered compact may be processed by surface grinding as needed.

Figure 2A:
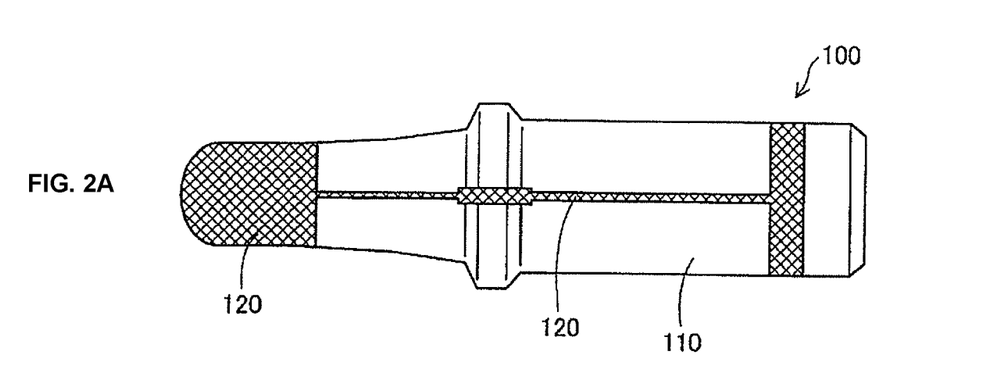
FIG. 2A is a front view of a gas sensor according to another embodiment of the present invention.
Figure 2B:
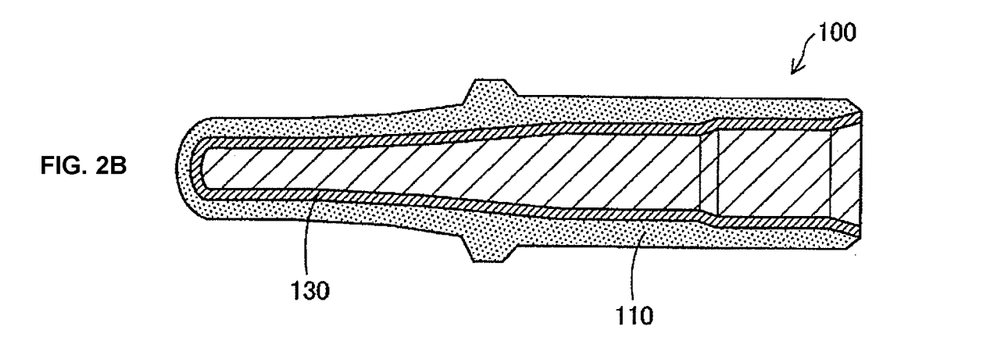
FIG. 2B is a cross-sectional view of the gas sensor.

FIG. 2A is a front view of a gas sensor according to another embodiment of the present invention, which utilizes the electrically conductive oxide sintered compact; and FIG. 2B is a cross-sectional view of the gas sensor. This gas sensor 100 has a cylindrical substrate 110 formed of a ceramic material (more specifically, yttria-stabilized zirconia), an outer electrode 120 formed of a noble metal on an outer surface of the substrate 110 and an air reference electrode 130 formed on an inner surface of the substrate 110. Herein, the air reference electrode 130 (as a reference electrode) is formed as a conductor layer of the electrically conductive oxide sintered compact. In this embodiment, the air reference electrode 130 is formed on almost the whole of the inner surface of the substrate 110.

Figure 3:
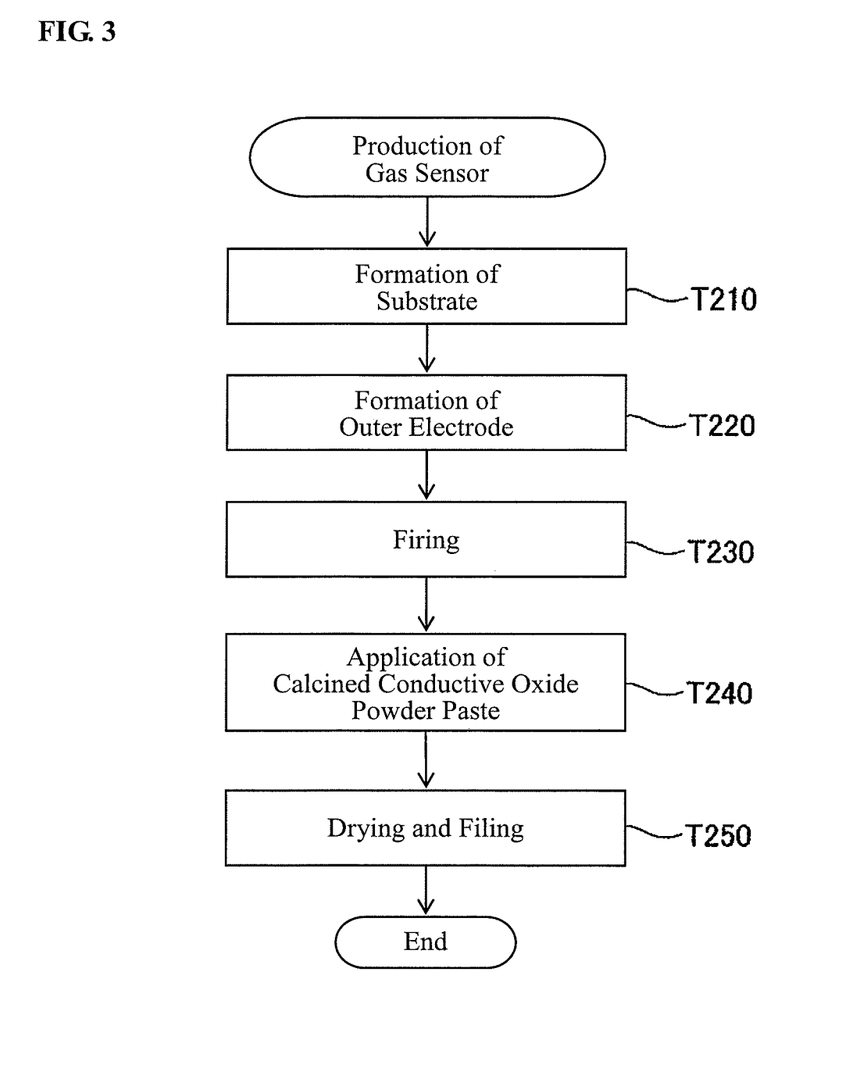
FIG. 3 is a flowchart showing a method for production of the gas sensor.

FIG. 3 is a flowchart showing a method for production of the gas sensor 100. In step T210, a raw material compact (green compact) is formed by pressing a material for the substrate 110 (e.g. yttria-stabilized zirconia powder) into a shape (cylindrical shape) of FIGS. 2A and 2B. In step T220, the outer electrode 120 is formed on an outer side of the raw material compact by printing or dipping process using a Pt or Au paste. In step T230, the resulting compact is fired at a firing temperature of 1250 to 1600° C. to provide an yttria-stabilized zirconia sintered compact. In step S240, a paste is prepared by forming a calcined powder according to steps T110 and T120 of FIG. 1 and dissolving the calcinated powder together with a binder such as ethyl cellulose into a solvent such as terpineol or butyl carbitol, and then, is applied to an inner side of the cylindrical yttria-stabilized zirconia sintered compact. In step T250, the paste is dried and fired at e.g. 1100° C. By this, the oxygen sensor is obtained. It should be understood that the respective production conditions of the production methods of FIGS. 1 and 3 are merely examples and can be varied as appropriate depending on the purposes of uses of the products.

C. Examples and Comparative Examples

FIG. 4 is a diagram showing compositions and properties of respective samples. Herein, the samples S01 to S19 correspond to working examples; and the samples S31 to S37 correspond to comparative examples. Each sample was an oxide sintered compact produced according to the above-explained production method of FIG. 1 and finally processed by surface grinding into a rectangular parallelepiped shape with dimensions of 3.0 mm×3.0 mm×15 mm. In step T110, the raw material powders for each sample were weighed and mixed together at composition ratios as shown in FIG. 4. The rare-earth element was: La in the samples S01 to S16, S19 and S31 to S37; Pr in the sample S17; and Nd in the sample S18.

As will be explained later, the respective sample compositions were subjected to firing at a plurality of firing temperatures. In FIG. 4, typical firing temperatures of the respective samples are shown. More specifically, the "firing temperature" shown refers to a firing temperature at which the sample had a water absorption rate of 0.10 wt % or lower (see below) and the highest room-temperature conductivity. Each of the samples S01 to S19 had the highest room-temperature conductivity when fired at 1100 to 1450° C. The sample S37 was not sufficiently sintered.

The evaluation results on the following four items: room-temperature conductivity, specific gravity, sinterability and peel strength of the respective samples are shown in FIG. 4. The room-temperature conductivity, sinterability and peel strength were measured or determined by the following procedures.

<Measurement of Conductivity>

The conductivity of each sample was measured by the direct current four terminal method. Electrodes and electrode wires used in the measurement were of Pt. Further, the measurement of the conductivity was carried out with the use of a voltage current source (monitor 6242 manufactured by ADC CORPORATION).

<Determination of Sinterability>

The sinterability of each sample was determined according to JIS R 1634. More specifically, the dry weight W1 and water saturated weight W3 of the sample were measured. From the measurement results, the water absorption rate was determined by the following formula (4).

$$\text{Water Absorption Rate (\%)} = (W3-W1)/W1 \times 100 \quad (4)$$

The sinterability of the sample was evaluated according to the following criteria: "X" when the water absorption rate exceeded 0.10 wt %; "Δ" when the water absorption rate was higher than or equal to 0.05 wt % and lower than or equal to 0.10 wt %; and "○" when the water absorption rate was lower than 0.05 wt %. The water absorption rate evaluation result "Δ" or "○" means the oxide sintered compact had good sinterability to attain dense structure so that there would be no problem in practical use of the sintered compact as a conductor.

<Adhesion Test>

The adhesion test between the conductive oxide sintered compact and the substrate was performed as follows. First, plate-shaped sintered YSZ (yttria-stabilized zirconia) substrates were prepared. Slurries were also prepared by dissolving calcined powders of oxides of the compositions shown in FIG. 4 into a solvent such as ethanol. Adhesion test samples were each formed by applying a layer of the slurry to the YSZ substrate, drying the applied slurry layer and firing the dried slurry layer at 1100° C. These adhesion test samples was tested for the peel strength at the interface between the conductive oxide sintered compact and the YSZ substrate with the use of a surface and interfacial cutting analysis system (SAICAS). The peel strength analysis system used was DN-100S SAICAS manufactured by DAYPLA WINTES CO., LTD. Further, a sintered BN (borazon) cutting blade with a blade width w of 2.0 mm, a rake angle of 20° and a relief angle of 10° was used. In the peel strength test, cutting operation was conducted in a constant-speed mode (vertical speed: 0.4 μm/sec, horizontal speed: 8 μm/sec) under the conditions of a shear angle of 45°, a press load of 0.5 N and a balance weight of 0.5 N. Horizontal and vertical forces were recorded during the cutting operation. From the recorded horizontal force FH and the blade width w, the peel strength P was determined by the following formula (5).

$$P[\text{kN/m}] = FH[\text{kN}]/w[\text{m}] \quad (5)$$

The peel strength of the sample was evaluated according to the following criteria: "X" when the peel strength P was lower than 0.1 kN/m; "Δ" when the peel strength P was higher than or equal to 0.1 kN/m and lower than 1.0 kN/m; and "○" when the peel strength P was higher than or equal to 1.0 kN/m.

Each of the samples S01 to S19 shown in FIG. 4 had the composition given by the above formulas (1) and (2a) to (2d). The samples S01 to S19 had a sufficiently high room-temperature conductivity, good sinterability and good peel strength. In the case of using the conductive oxide sintered compact as a conductor, it is preferable that the room-temperature of the conductive oxide sintered compact is as high as possible. All of the samples S01 to S19 were preferable in that these samples had a high room-temperature conductivity of 200 S/cm or higher, i.e., exceeding 100 S/cm. By contrast, the comparative example samples S32 to S36 has a low room-temperature conductivity of lower than 100 S/cm. The comparative example sample S31 had a high room-temperature conductivity but did not have sufficient peel strength. Further, the comparative example sample S37 was not sufficiently sintered.

Among the working example samples S01 to S19, the parameter values a, b, c and d of three samples S03, S17 and S18 were common. However, these three samples S03, S17 and S18 were different in that La, Pr and Nd were respectively contained as the rare-earth element RE. The sample S03 where the rare-earth element RE was La was more preferable than the samples S17 and S18 where the rare-earth element RE was Pr and Nd in that the room-temperature conductivity of the sample S03 was higher than those of the samples S17 and S18. The sample S03 where the rare-earth element RE was La was also more preferable in that the absolute value of the B constant tends to be smaller when La was used as the rare-earth element RE than when the other rare-earth element was used.

Among the working example samples S01 to S19, each of the samples S01 to S08 and S15 had the composition given by the above formulas (1) and (3a) to (3d). All of the samples S01 to S08 and S15 were preferable in that the room-temperature conductivity of these samples was set to be 1200 S/c or higher by selection of the optimal firing temperature.

The specific gravity shown in FIG. 4 refers to values obtained at the typical firing temperatures as an index of the denseness of the sintered compact. The specific gravity of the conductive oxide sintered compact is preferably as high as possible. It is preferable that the specific gravity of the conductive oxide sintered compact is 5.0 g/cm$^{-3}$.

Figure 5:
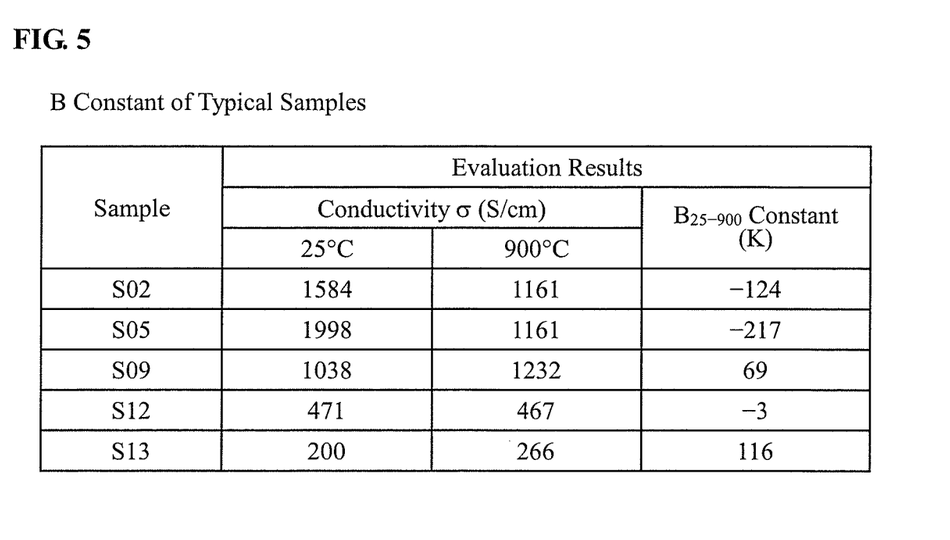
FIG. 5 is a diagram showing B constant values of some typical samples.

FIG. 5 is a diagram showing B constant values of some typical samples. The B constant was determined by the following procedure.

<Determination of B Constant>

The conductivity of each sample was measured at 25° C. and 900° C. according to the method explained above in <Measurement of Conductivity>. From the measurement results, the B constant (K) was determined by the following formula (6):

$$B\ constant = \ln(\rho 1/\rho 2)/(1/T1 - 1/T2) \qquad (6)$$

where $\rho 1 = \sigma 1$; $\rho 2 = \sigma 2$; $\rho 1$ is the resistance (Ωcm) at absolute temperature T1 (K); $\rho 2$ is the resistance (Ωcm) at absolute temperature T2 (K); $\sigma 1$ is the conductivity (Ωcm) at absolute temperature T1 (K); $\sigma 2$ is the conductivity (Ωcm) at absolute temperature T1 (K); T1=298.15 (K); and T2=1143.15 (K).

As shown in FIG. 5, each of the typical samples S02, S05, S09, S12 and S13 had a sufficiently small B constant absolute value of 220 or smaller and had a sufficiently high conductivity regardless of changes in temperature. It was confirmed that the other working example samples showed substantially the same tendency as these typical examples although not specifically shown in the diagram. Namely, the working example samples S01 to S10 had a B constant suitable for use as a conductor layer.

Figure 6A:
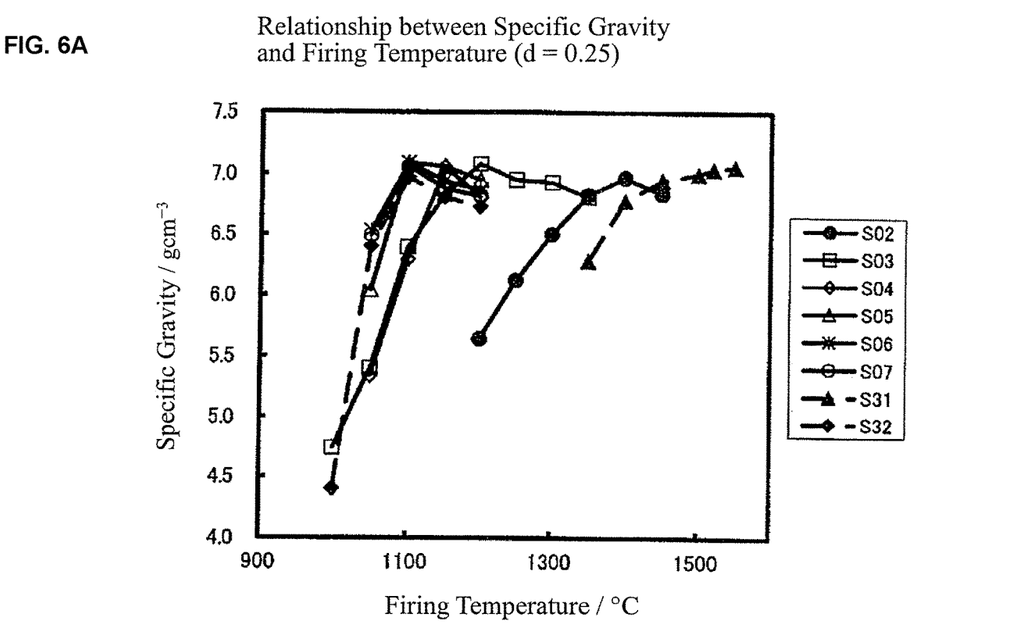
FIGS. 6A and 6B are diagrams showing changes of specific gravity and room-temperature conductivity respectively, of typical samples relative to firing temperature.
Figure 6B:
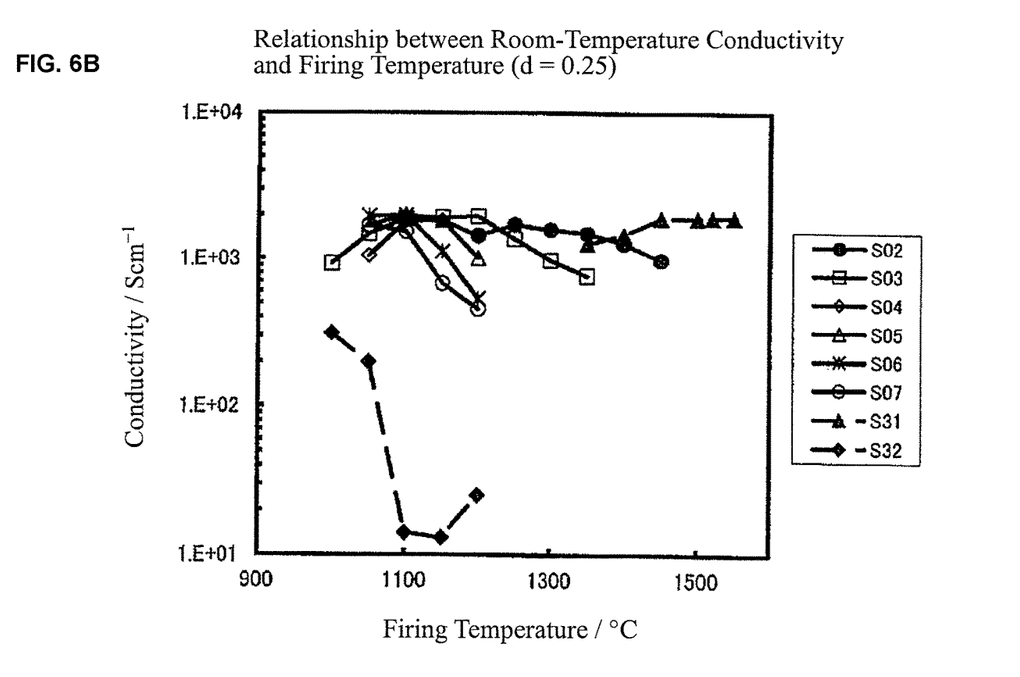

FIGS. 6A and 6B are graphs showing changes of the specific gravity and room-temperature conductivity of some typical samples relative to the firing temperature. More specifically, FIGS. 6A and 6B show changes of the specific gravity and room-temperature conductivity of the samples S02 to S07, S31 and S32 where the parameter d of Ni was set to a constant value of 0.25 in response to changes of the firing temperature. The working example samples S02 to S07 had a high room-temperature conductivity of 400 S/cm or higher even though the firing temperature was changed within the range of 1050° C. to 1550° C. By contrast, the comparative example sample S32 had a considerably low room-temperature conductivity of about 10 S/cm when fired at 1100° C. The comparative example sample S32 was thus not preferred in comparison with the working example samples. The comparative example sample S31 had a high room-temperature conductivity, but did not have sufficient peel strength (see the right column of FIG. 4), when fired within the range of 1350 to 1550° C. Further, the comparative example sample S31 had a tendency to cause a significant decrease of the specific gravity due to sinterability deterioration when the firing temperature becomes lower than or equal to 1300° C.

Figure 7A:
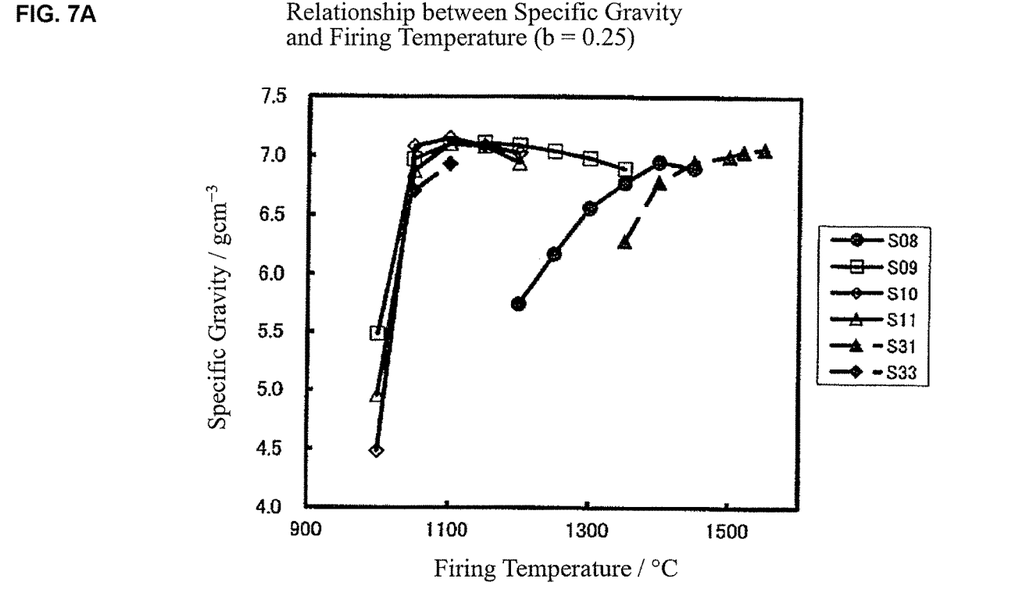
FIGS. 7A and 7B are diagrams showing changes of specific gravity and room-temperature conductivity respectively, of other typical samples relative to firing temperature.
Figure 7B:
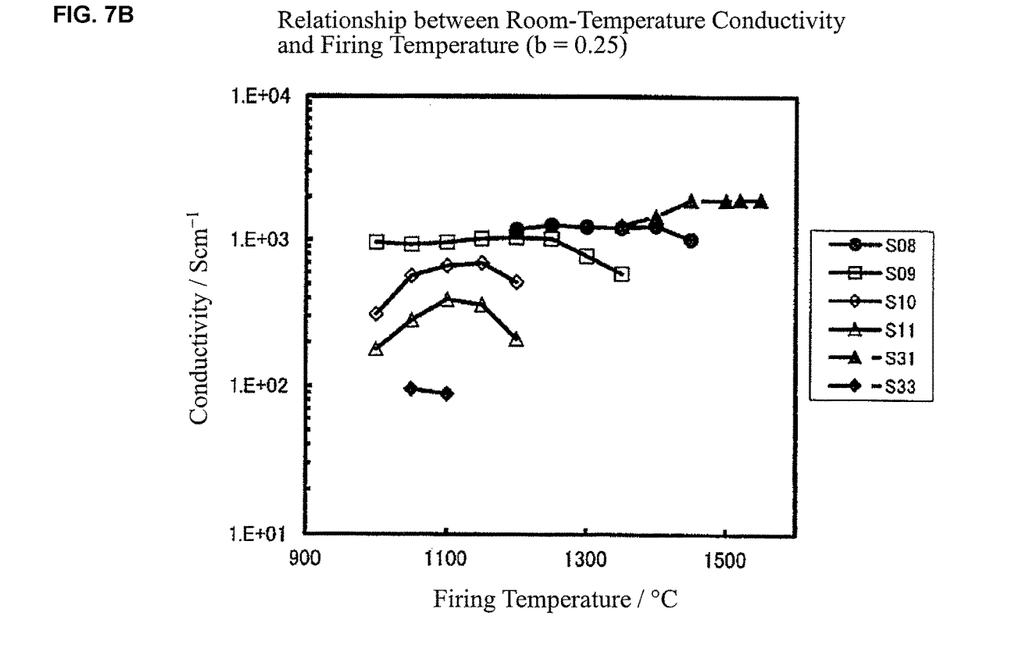

FIGS. 7A and 7B graphs showing changes of the specific gravity and room-temperature conductivity of some other typical samples relative to the firing temperature. More specifically, FIGS. 7A and 7B show changes of the specific gravity and room-temperature conductivity of the samples S08 to S11, S31 and S33 where the parameter b of Co was set to a constant value of 0.25 in response to changes of the firing temperature. The working example samples S08 to S11 had a high room-temperature conductivity of 100 S/cm or higher even though the firing temperature was changed within the range of 1050° C. to 1550° C. By contrast, the comparative example sample S33 had a considerably low room-temperature conductivity of lower than 100 S/cm when fired at 1100° C. The comparative example sample S33 was thus not preferred in comparison with the working example samples.

In consideration of the above results of FIGS. 6A, 6B, 7A and 7B, it has been shown the conductive oxide sintered compact attains a room-temperature conductivity of 100 S/cm or higher while having a firing temperature selectable within the range of about 1100° C. to about 1500° C. when the parameter values a, b, c and d satisfy the above conditions (2a) to (2d) (as in the samples S01 to S19 of FIG. 4). In this case, the firing temperature can be selected within the range of about 1050° C. to about 1550° C. depending of the sintered compact. It has also been shown that, when the parameter values a, b, c and d satisfy the above conditions (3a) to (3d) (as in the samples of S01 to S08, S12, S13 and S15 of FIG. 4), the conductive oxide sintered compact attains a room-temperature conductivity of 400 S/cm while having a firing temperature selectable within the range of about 1100° C. to about 1500° C. In this case, the sintered compact can attain a room-temperature conductivity of 1200 S/cm or higher by selection of the optimal firing temperature.

D. Other Embodiments

Figure 8:
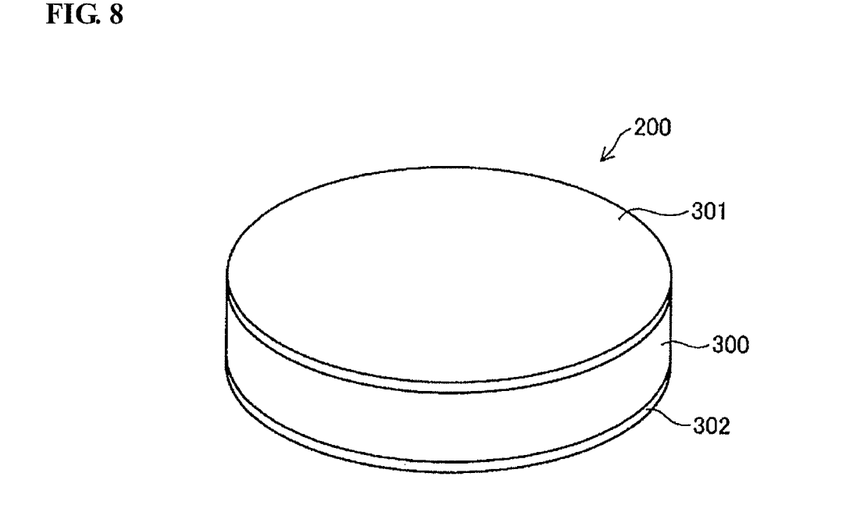
FIG. 8 is a perspective view of a piezoelectric element according to still another embodiment of the present invention.

FIG. 8 is a perspective view of a piezoelectric element according to still another embodiment of the present invention. This piezoelectric element 200 has a disk-shaped piezoelectric ceramic body 300 and electrodes 301 and 302 attached to upper and lower surfaces of the piezoelectric ceramic body 300. Each of the electrodes 301 and 302 is formed of the above-mentioned electrically conductive oxide sintered compact. The piezoelectric element can be provided in any shape and configuration other than the above.

Figure 9:
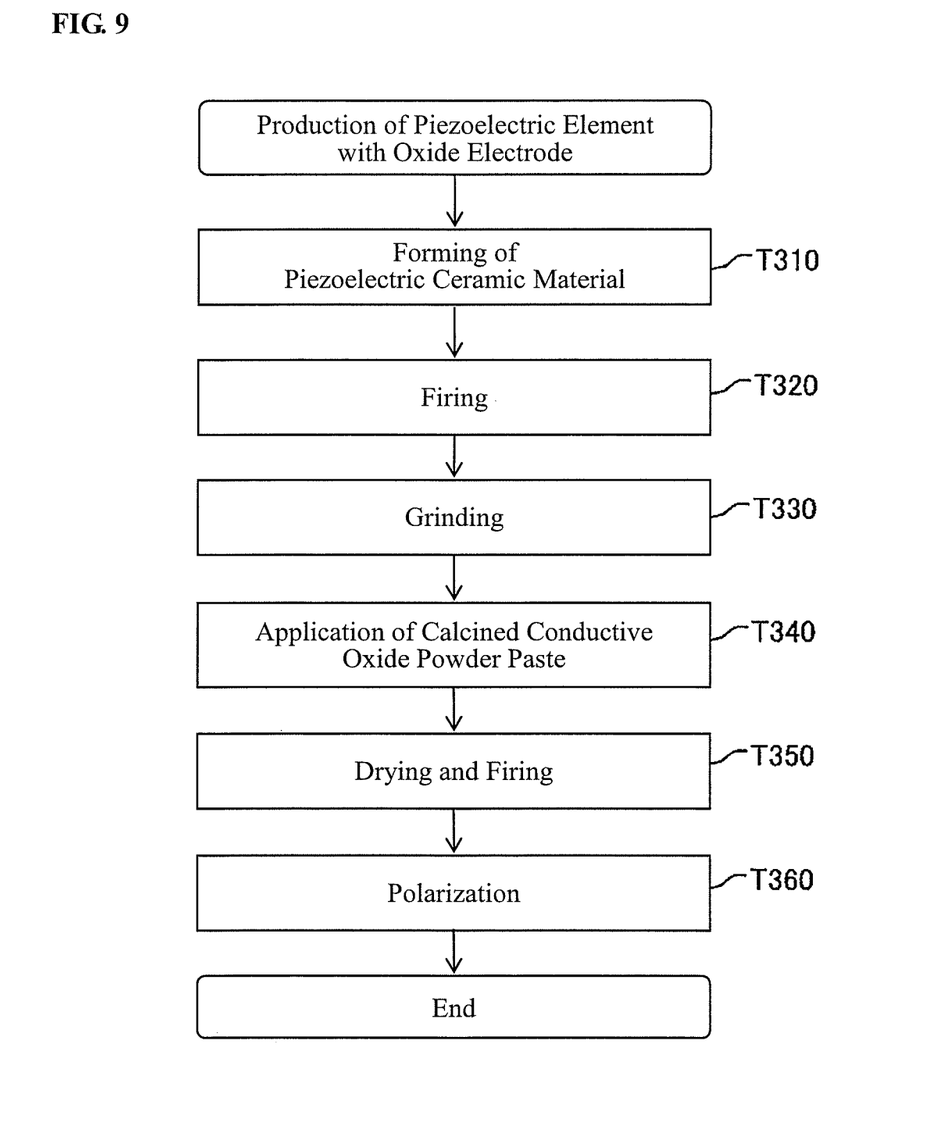
FIG. 9 is a flowchart showing a method for production of the piezoelectric element.

FIG. 9 is a flowchart showing a method for production of the piezoelectric element 200. In step S310, a raw material compact (green compact) is formed by pressing a powder of piezoelectric material into a shape (disk shape) of the piezoelectric ceramic body 300 as shown in FIG. 8. As the piezoelectric material, there can be used a lead-free piezoelectric ceramic composition as disclosed in Japanese Patent No. 5823014 (abbreviated as JP 5823014B), which is owned by the present applicant and is herein incorporated by reference in its entirety. The lead-free piezoelectric ceramic composition preferably contains at least a main phase (first crystal phase) of alkali niobate/tantalate perovskite oxide having piezoelectric properties and may further contain any crystal phase other than the main phase as a sub phase (second crystal phase). Alternatively, any other piezoelectric material (e.g. lead-containing piezoelectric material) may be used for the formation of the piezoelectric ceramic body 300.

The perovskite oxide of the main phase of the lead-free piezoelectric ceramic composition is preferably of the kind represented by the following composition formula.

$$(K_aNa_bLi_cC_d)_e(D_fE_g)O_h \qquad (7)$$

In the above composition formula, C is one or more kinds of elements selected from Ca (calcium), Sr (strontium), Ba (barium) and Rb (rubidium); D is one or more kinds of elements selected from Nb (niobium), Ta (tantalum), Ti (titanium) and Zr (zirconium); E is one or more kinds of elements selected from Mg (magnesium), Al (aluminum), Sc (scandium), Mn (manganese), Fe (iron), Co (cobalt), Ni (nickel), Zn (zinc), Ga (gallium) and Y (yttrium); a, b, c and d are values satisfying a+b+c+d=1; e is an arbitrary value; f and g are values satisfying f+g=1; and h is an arbitrary value for forming the perovskite oxide, which typically satisfies 2.9≤h<3.1.

One typical example of the composition of the main phase is as follows:

(8)

where a+b+c+d1+d2=1; e is an arbitrary value; f and g are values satisfying f1+f2+f3=1; and h is an arbitrary value for forming the perovskite oxide.

The sub phase of the lead-free piezoelectric ceramic composition may contain at least one or more kinds of the following oxides (a) to (e):
(a) single-metal oxides of metal elements selected from Mg (magnesium), Ni (nickel), Co (cobalt), Fe (iron), Mn (manganese), Cr (chromium), Zr (zirconium), Ti (titanium), Ag (silver), Zn (zinc), Sc (scandium) and Bi (bismuth);
(b) M-Ti—O spinel compounds (where M is a monovalent to pentavalent metal element);
(c) $A_2B_6O$ compounds (where A is a monovalent metal element; and B is a divalent to pentavalent metal element);
(d) $A_3B_5O$ compounds (where A is a monovalent or divalent metal element; and B is a divalent to pentavalent metal element); and
(e) A-Ti—B—O compounds (where A is an alkali metal element; and B is at least one of Nb and Ta).

The sub phase is not necessarily contained in the lead-free piezoelectric ceramic composition. In the case where the sub phase is contained in the lead-free piezoelectric ceramic composition, the total amount of the sub phase contained is preferably 5 vol % or less based on the total amount of the lead-free piezoelectric ceramic composition.

In step T320 of FIG. 9, the above-prepared compact is fired at a firing temperature of higher than 1000° C. and lower than equal to 1200° C. (preferably at about 1150° C.) under an air atmosphere to provide a piezoelectric ceramic sintered compact. In step T330, the piezoelectric ceramic sintered compact is processed into a predetermined shape (e.g. with a diameter of 16 mm and a thickness of 1 mm) by grinding surfaces of the piezoelectric ceramic sintered compact. In step T340, a conductive oxide paste is prepared by forming a calcined powder according to steps T110 and T120 of FIG. 1 and dissolving the calcinated powder together with a binder such as ethyl cellulose into a solvent such as terpineol or butyl carbitol, and then, is applied to both of the surfaces of the piezoelectric ceramic sintered compact. At this time, it is preferable to apply the conductive oxide paste directly to the surfaces of the piezoelectric ceramic sintered compact without applying another material to the surfaces of the piezoelectric ceramic sintered compact. In step T350, the applied paste layer is dried and fired at a firing temperature higher than that in step T320 (e.g. higher than or equal to 1000° C. and lower than 1200° C., preferably about 1100° C.) under an air atmosphere. By this, the piezoelectric element 200 (see FIG. 8) is obtained. The piezoelectric element 200 is completed by polarization treatment under conditions of e.g. 4 kV/mm, 10 min and 40° C. in step T360.

It should be understood that the respective production conditions of the production method of FIG. 9 are merely examples and can be varied as appropriate depending on the purposes of use of the product. For example, the sintered ceramic body 300 and the electrodes 301 and 302 may be simultaneously fired in one firing step.

In the production method of FIG. 9, the second firing step T350 for the formation of the conductive oxide electrodes 301 and 302 by firing is performed after the first firing step T320 for the formation of the piezoelectric ceramic body 300 by firing. Furthermore, the second firing step T350 is performed at a lower firing temperature than that of the first firing step T320. If the piezoelectric ceramic body 300 and the electrodes 301 and 302 are formed by simultaneous firing in one firing step, the compositions of the piezoelectric ceramic body 300 and the electrodes 301 and 302 may be changed due to diffusion of constituent elements during the firing. In order to avoid such composition changes caused by the firing, it becomes necessary to provide a diffusion preventing layer between the green compact of the piezoelectric ceramic material and the applied layer of the conductive oxide paste. In the production method of FIG. 9, however, it is possible to obtain the piezoelectric ceramic element 200 of the desired composition, without providing the diffusion preventing layer, because the electrodes are formed by firing at a lower temperature in the second firing step T350 after the formation of the piezoelectric ceramic body by firing in the first firing step S320.

In order to set the firing temperature of the second firing step T350 lower than the firing temperature of the first firing step T320, the conductive oxide used as the material of the electrodes preferably has a firing temperature of 1200° C. or lower. As mentioned above, the firing temperatures of the respective samples shown in FIG. 4 are typical firing temperatures at which the respective samples had a water absorption rate of 0.10 wt % or lower (see below) and the highest room-temperature conductivity. The conductive oxide with a typical firing temperature of 1200° C. corresponds to, for example, the samples S03 to S07. In consideration of these points, it is preferable that the parameter values a, b, c and d of the above composition formula (1) respectively satisfy the following conditions for use of the conductive oxide sintered body as the material of the electrodes of the piezoelectric element 200.

$$0.494 \leq a \leq 0.506 \quad (9a)$$

$$0.050 \leq b \leq 0.250 \quad (9b)$$

$$0.100 \leq c \leq 0.200 \quad (9c)$$

$$0.200 \leq d \leq 0.270 \quad (9d)$$

Figure 10:
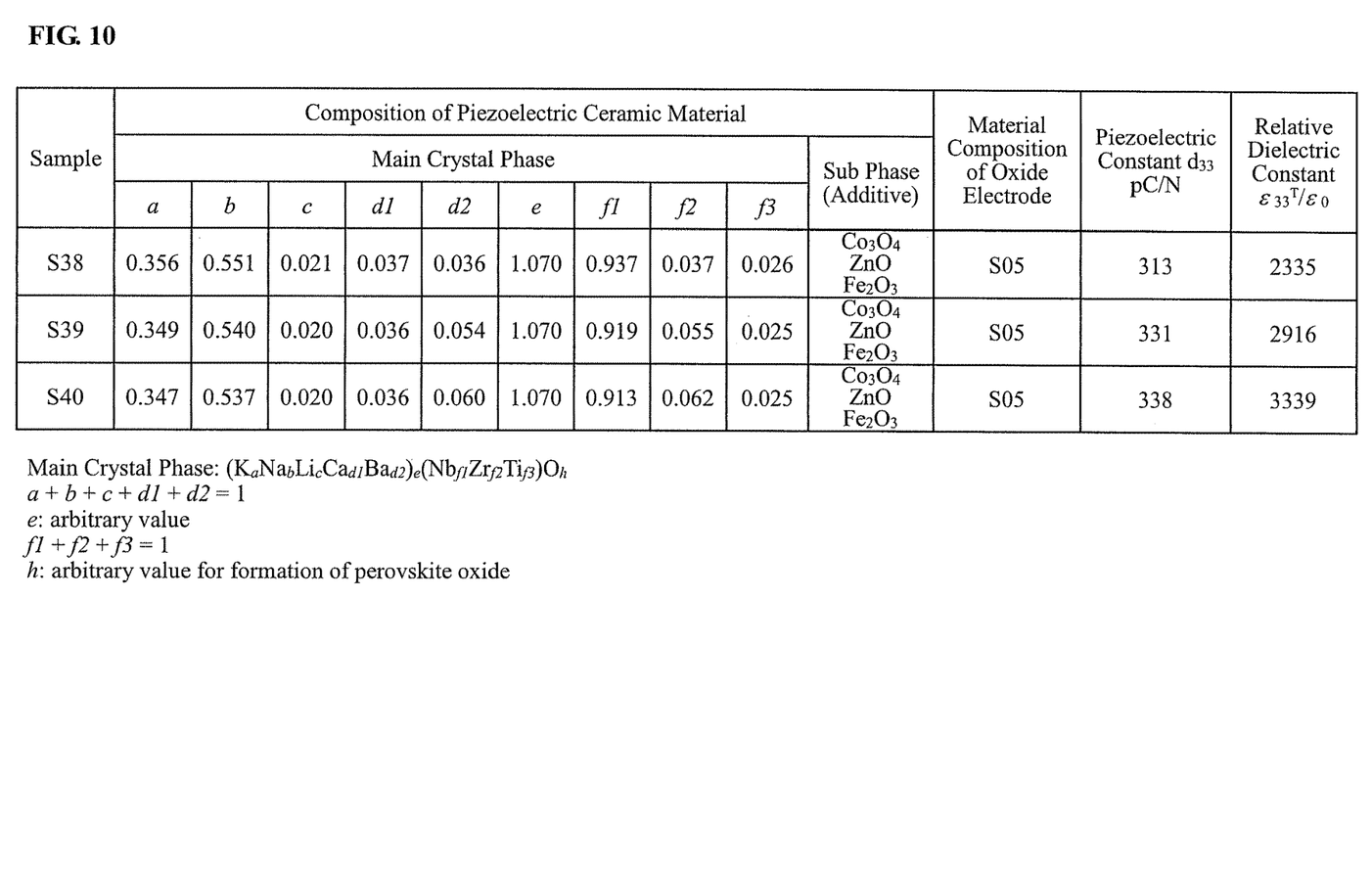
FIG. 10 is a diagram showing results of experiments with samples of the piezoelectric element.

FIG. 10 is a diagram showing results of experiments with samples S38 to S40 of the piezoelectric element 200. In each sample, the piezoelectric ceramic body 300 was formed of a lead-free piezoelectric ceramic composition containing a first crystal phase (main phase) of alkali niobate perovskite oxide represented by the above composition formula (8) and 5 vol % or less of a sub phase of metal oxide ($CO_3O_4$, ZnO, $Fe_2O_3$). The electrodes 301 and 302 were formed of the conductive oxide of the sample S05 of FIG. 4. The evaluation results on the piezoelectric constant $d_{33}$ and relative dielectric constant $\varepsilon_{33}^T/\varepsilon_0$ of the respective samples are shown in the right columns of FIG. 10. The piezoelectric constant $d_{33}$ was measured with the use of a $d_{33}$ meter (ZJ-4B manufactured by IAAS Ltd.). The relative dielectric constant $\varepsilon_{33}^T/\varepsilon_0$ was measured at 1 kHz with the use of an impedance analyzer (HP4194A manufactured by Hewlett-Packard Company).

Each of the samples S38 to S40 had a piezoelectric constant $d_{33}$ of 300 pC/N or higher and a relative dielectric constant $\varepsilon_{33}{}^T/\varepsilon_0$ of 2300 or higher and thus showed good piezoelectric characteristics. It has thus been shown that the conductive oxide sintered compact satisfying the above composition formula (1) is usable as an oxide electrode material for a piezoelectric element which is low in price and capable of being fired under an air atmosphere.

Modifications:

The present invention is not limited to the above-mentioned embodiments and examples and can be changed and modified within the range that does not deviate from the scope of the present invention.

DESCRIPTION OF REFERENCE NUMERALS

100: Gas Sensor
110: Substrate
120: Outer Electrode
130: Air Reference Electrode (Conductor Layer)
200: Piezoelectric Element
300: Piezoelectric Ceramic Body
301, 302: Electrode

The invention claimed is:

1. An electrically conductive oxide sintered compact comprising a crystal phase that has a perovskite oxide crystal structure represented by the composition formula: $RE_a Co_b Cu_c Ni_d O_x$ where RE is a rare-earth element selected from the group consisting of La, Pr, Nd, Pm and Sm; $a+b+c+d=1$; and $1.25 \leq x \leq 1.75$, wherein the values of a, b, c and d respectively satisfy the following conditions:

$0.487 \leq a \leq 0.506$;

$0.050 \leq b \leq 0.250$;

$0.098 < c < 0.250$; and $0.244 \leq d \leq 0.275$.

2. The electrically conductive oxide sintered compact according to claim 1, wherein the rare-earth element RE is La.

3. An electrical conduction member, comprising:
a substrate formed of a ceramic material; and
a conductor layer formed of the electrically conductive oxide sintered compact according to claim 1 on a surface of the substrate.

4. A gas sensor comprising an electrode formed of the electrically conductive oxide sintered compact according to claim 1.

5. A piezoelectric element, comprising:
a piezoelectric ceramic body formed of a piezoelectric ceramic composition; and
an electrode formed of the electrically conductive oxide sintered compact according to claim 1 on a surface of the piezoelectric ceramic body.

6. A method for producing the piezoelectric element according to claim 5, comprising:
a forming step of forming a green compact of the piezoelectric ceramic composition;
a first firing step of firing the green compact at a first firing temperature, thereby providing the piezoelectric ceramic body;
an application step of applying a conductive oxide paste for formation of the electrically conductive sintered compact to the surface of the piezoelectric ceramic body; and
a second firing step of firing the piezoelectric ceramic body with the conductive oxide paste applied thereto at a second firing temperature lower than the first firing temperature.

* * * * *